Sept. 15, 1964    W. T. RENTSCHLER    3,148,608
PHOTOGRAPHIC CAMERA
Filed Sept. 12, 1960    5 Sheets-Sheet 1
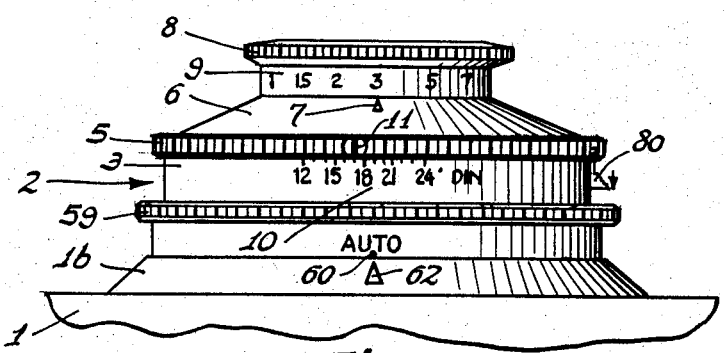
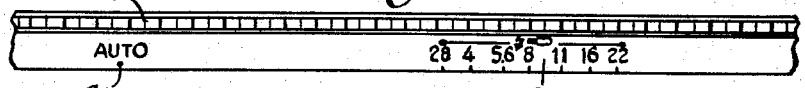
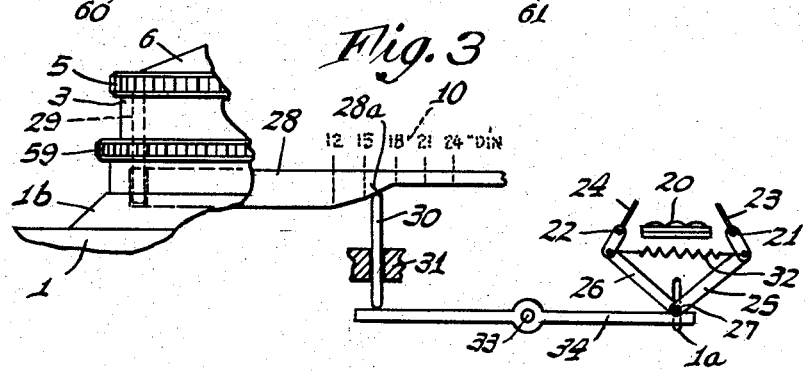
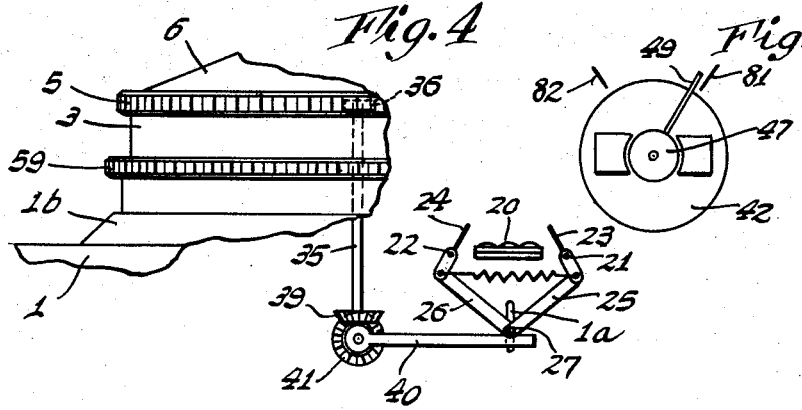
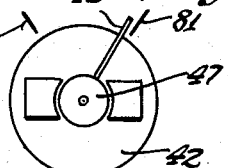
INVENTOR.
Waldemar T. Rentschler
BY
March, Gillette, Virgil & Eslinger
ATTORNEY Sept. 15, 1964  W. T. RENTSCHLER  3,148,608
PHOTOGRAPHIC CAMERA
Filed Sept. 12, 1960  5 Sheets-Sheet 2
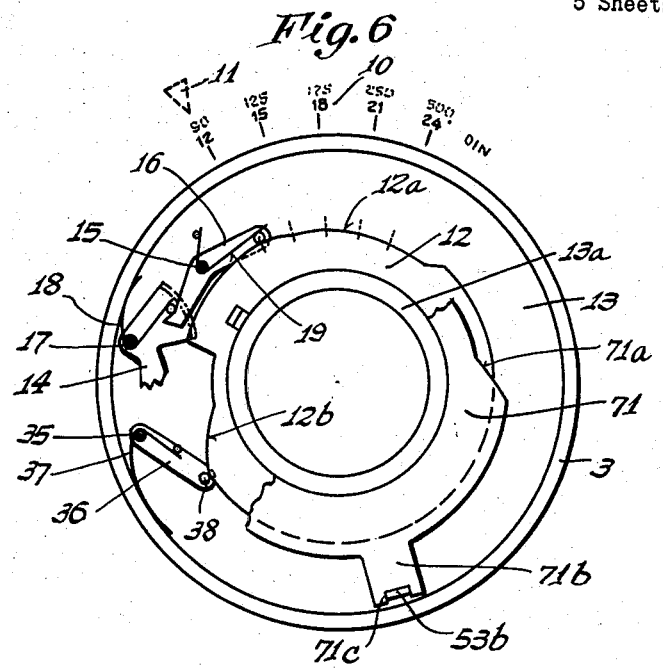
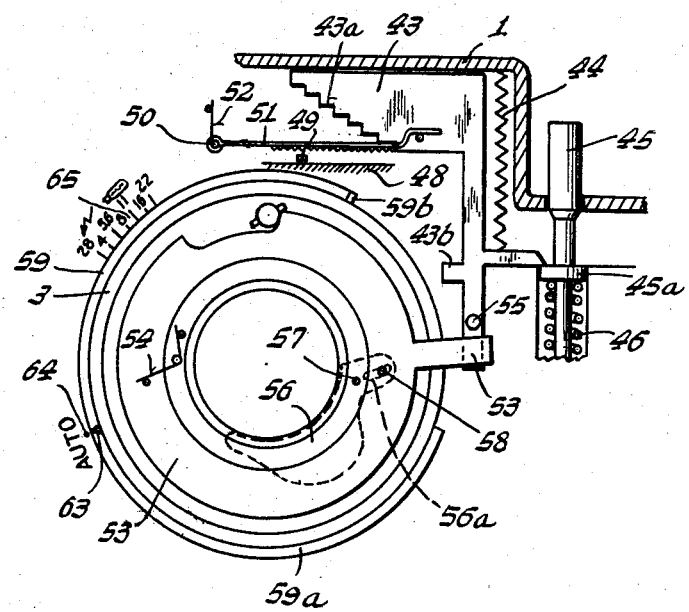
INVENTOR.
Waldemar T. Rentschler
BY
March, Gillette, Virgil & Eslinger
ATTORNEY

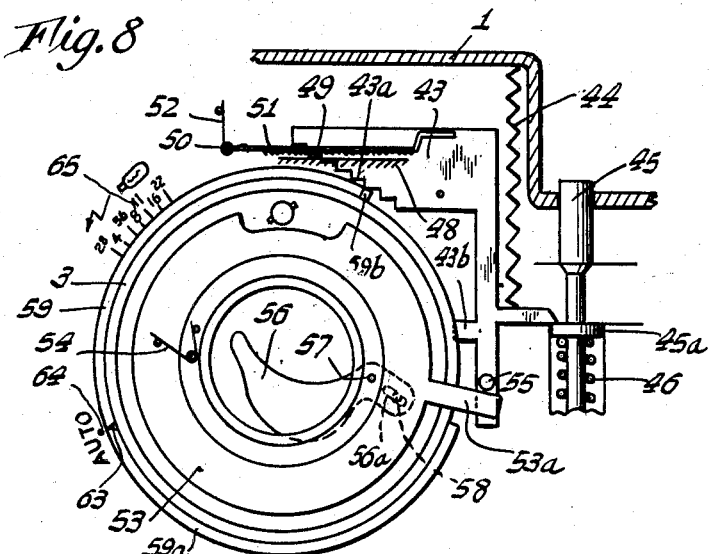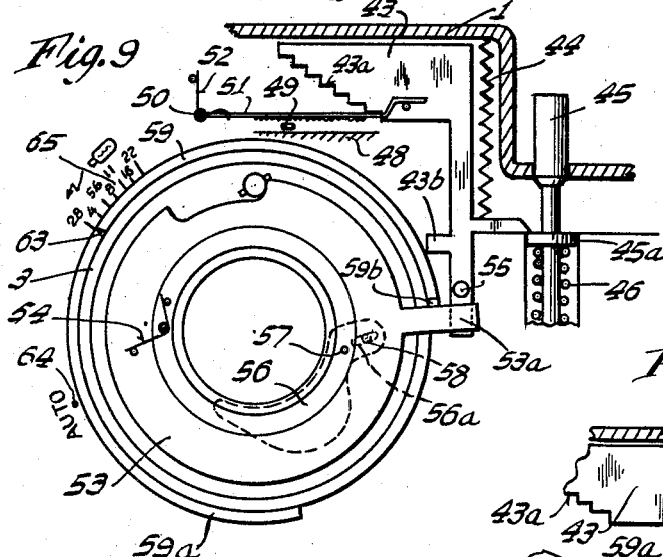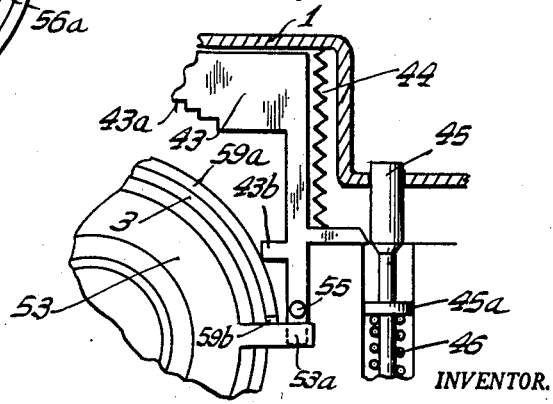

Sept. 15, 1964     W. T. RENTSCHLER     3,148,608
PHOTOGRAPHIC CAMERA
Filed Sept. 12, 1960                             5 Sheets-Sheet 4
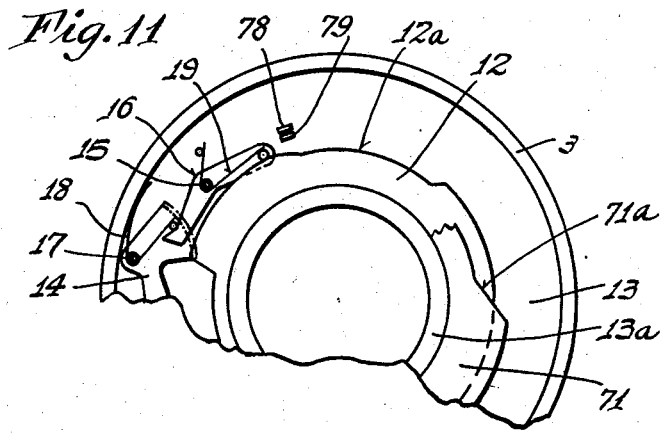
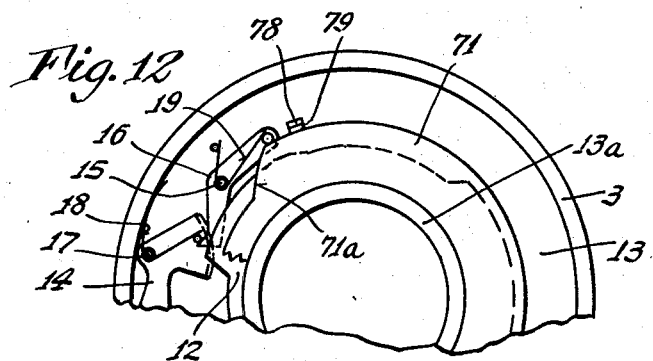
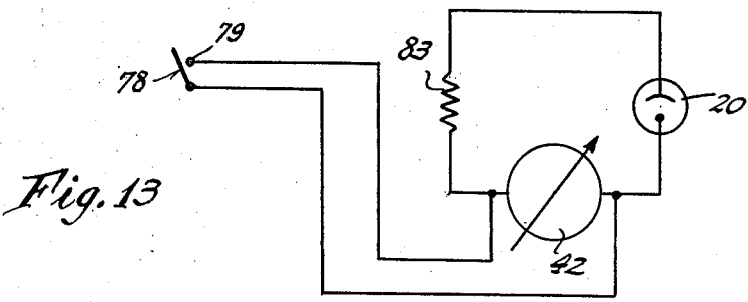
INVENTOR.
Waldemar T. Rentschler
BY
March, Gillette, Virgil & Eslinger
ATTORNEYS

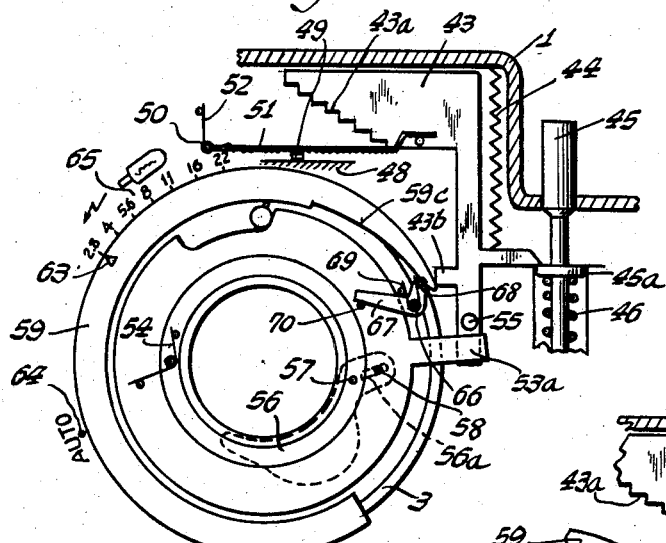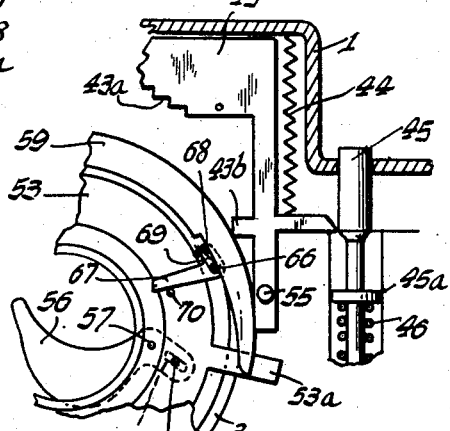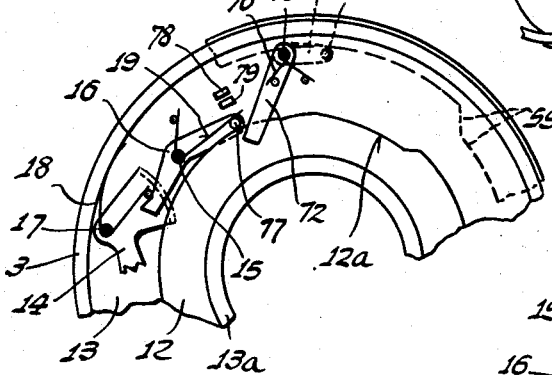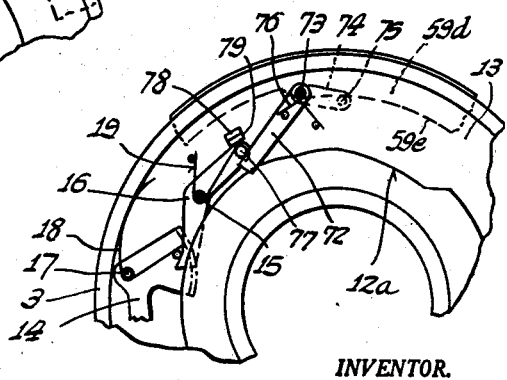

United States Patent Office 3,148,608
Patented Sept. 15, 1964

3,148,608
PHOTOGRAPHIC CAMERA
Waldemar T. Rentschler, Calmbach (Enz), Germany, assignor to Alfred Gauthier, G.m.b.H., Calmbach (Enz), Germany, a corporation of Germany
Filed Sept. 12, 1960, Ser. No. 55,456
Claims priority, application Germany Sept. 16, 1959
14 Claims. (Cl. 95—64)

This invention relates generally to photographic cameras of the type provided with automatic diaphragm setting or control mechanisms which are actuated in response to movement of a light intensity measuring device and which are also manually settable concurrently with adjustment of a manually operable shutter-speed setting member.

An object of the present invention is to provide a novel and improved camera of the above described kind, which is especially simple and uncomplicated in its construction, dependable in operation so as to insure the taking of successful photographs, and which moreover is characterized by a comparatively large film sensitivity setting range while at the same time having a wide range of use.

In accomplishing the above object, the invention provides a novel combination which includes a well-known device for obtaining different shutter speeds especially suited for the taking of photographs with the camera manually held, an equally well-known device for changing the sensitivity of the light-intensity measuring mechanism, these being in conjunction with a shutter-speed or exposure time setting member which is arranged to control the said two devices, said setting member for this purpose comprising a plurality of control members whereby shifting of the speed setting member along its adjustment range defines a setting range for film sensitivity as a consequence of changing the shutter speed and/or sensitivity of the light intensity measuring device. The speed setting member has connected with it a film sensitivity scale means, by which indications may be given concerning various films and their speed values.

A camera as thus constructed in accordance with the invention has the advantage that it can be operated without requiring any mental work or calculations on the part of the operator. This advantage is due to the fact that both the factors of shutter speed and diaphragm completely disappear from the adjusting operation, as far as the operator is concerned. The only setting member which must be adjusted in accordance with a scale is the film sensitivity setting member, which now is represented by the exposure-time or speed setting member. The limitation employed, involving exposure times or speeds which are suited for taking photographs with the camera manually held insures satisfactory pictures which are not spoiled by slight accidental or incidental moving of the camera and which are also satisfactory with regard to photographing moving objects when this is done for any setting position of the speed setting member, that is, for any setting on the film sensitivity scale. Furthermore, the combination in accordance with the invention of a well-known device for obtaining different speeds suited for photographs with the camera manually held, in conjunction with an equally well known device for changing the sensitivity of the light intensity measuring device and the use of these for taking into consideration different film sensitivities produces the special advantage that, on the one hand, allowance can be made for a relatively large range or expanded scale of film sensitivities whereas, on the other hand, due to a very extensive utilization of the diaphragm adjusting range and hence the covering or masking of a correspondingly large range of brightness values of the subject (densities of light on the subject) those speeds can be exclusively used which are best suited to the taking of pictures with the camera handheld and also at the same time best suited to the photographing of moving objects. A camera as thus provided in accordance with the invention is characterized by a wide range of usefulness, both with respect to the kind of film that can be used and also with respect to the photographic or exposure range, as well as being characterized by an optimal operational simplicity and dependability.

The invention is not negatived by the fact that it is already known in cameras of the general type initially identified, to associate a film sensitivity scale with an exposure time or speed setting member for the purpose of utilizing different speed settings which are especially suited for the taking of photographs with the camera manually held. Such prior organization enables allowance to be made for different film sensitivities exclusively by adjustment of the shutter speed, whereby the number of different sensitivity values which may be chosen corresponds to the number of shutter speeds found to be suitable for photographs made with the camera manually held. But since the speed range suited for this type of picture taking (holding the camera manually) comprises only a few values, such arrangement as found in the prior art enables a film sensitivity range of only limited size or magnitude to be had. This substantially impairs or limits the useful range of such a camera, as compared with the range of the improved camera provided by the invention.

For the purpose of changing the sensitivity of the light intensity measuring device I have found it to be advantageous to use a mechanism by which there is changed the lighted or illuminated surface and/or the illumination intensity of a photo-cell or photo-electric cell of the light intensity measuring device, in response to setting or adjustment of the speed setting member.

Such mechanism is characterized by a simple and easily understood structure, by an easy adjusting operation, and by an organization which does not affect at all the structure and the characteristic features of the light intensity measuring device.

I provide cooperation between the speed setting member and the device or mechanism which changes the illuminated surface and/or the light intensity on the photo-cell or photoelectric cell of the light intensity measuring device, in an uncomplicated and economical manner which insures complete freedom of movement, by the use of a simple cam which is connected to the speed setting member and serves to influence the said mechanism.

When taking photographs utilizing permanent light, especially daylight, the invention provides for the use of a shutter speed which is associated with the chosen film sensitivity value and which also belongs within a range of speeds suited for the taking of photographs with the camera manually held. But when taking flash photographs using combustion flash lamps and X-synchronization, a certain minimum exposure time or maximum shutter speed is required, which is generally of the order of one-twenty-fifth or one-thirtieth of a second. A camera constructed in accordance with the invention can be further adapted for effecting flash photographs in a particularly advantageous manner, especially while maintaining the desired film sensitivity setting, by arranging a manually operable switch or selector which can be set at "automatic" and "non-automatic" positions and enables a switching of the diaphragm from automatic adjustment to manual adjustment, and a switching of the speed control device all without changing the position of the speed setting member, so as to provide a shutter speed which is suited for flash exposures.

A particularly advantageous arrangement, with regard to a simple structure and reliable method of operation, is obtained by providing a sensing member for the purpose of automatically setting the diaphragm in response to the indications of the light intensity measuring device. The said setting member is connected to an actuating member of the diaphragm, and provides for sensing the position of the movable member of the light intensity measuring device in response to operation of the camera or shutter release. I further provide a locking device which can be connected or made operative in response to the selector being set at its "non-automatic" position, and which enables the sensing member to be retained in an end position which is associated either with the largest or else the smallest diaphragm aperture.

To avoid the use of additional structural members, the locking device for the sensing member may comprise a surface provided on the selector, which can be moved into the path of movement of a member or portion of the sensing device, in response to the selector being placed in its "non-automatic" position.

The selector itself may serve for effecting the manual settings of the diaphragm. For this purpose, there is provided a diaphragm scale and a setting or index mark cooperable with the scale and associated with the said selector, said scale and setting mark being arranged respectively either on the selector and a fixed stationary carrier part of the camera, or vice versa.

The procedure of simultaneously using the selector both as a "switching" means and a manually operable diaphragm setting member has the advantage of economy of manufacture while at the same time effecting a simplification of the camera structure.

An advantageous connection between the combined selector and manually operable diaphragm setting member on the one hand and the diaphragm actuating member on the other hand is obtainable without substantial additional expenditure, by the provision of a driving mechanism arranged between the diaphragm actuating member and the selector, said driving mechanism becoming operative in response to the selector being set in its "non-automatic" position.

In another manner, the driving connection between the diaphragm actuating member and the combined selector and manually operable diaphragm setting member may comprise a cam provided on the setting member for the purpose of obtaining an expanded scale of diaphragm aperture values associated with the selector, thereby insuring an easy setting, and also an easy readability of the diaphragm scale, thus facilitating the adjustment of the diaphragm.

The setting or selecting of a shutter speed which is suited for flash photographs independently of the position of the speed setting member can be effected in a simple manner which requires but slight additional expenditure, by providing a cam which is connected to the said selector and which influences a control member of the speed control device, in response to the selector being placed in its "non-automatic" position.

The invention may be further developed by the provision of a short circuiting switch which is provided in the circuit of the light intensity measuring device and which can be operated and closed by means of the selector, in response to the latter being set at its "non-automatic" position, thereby to render inoperative the automatic exposure control.

The shutting-off or rendering inoperative of the light intensity measuring device by such a short circuiting switch serves the purpose of reliably and unmistakably informing the operator that the camera is no longer in the "automatic" exposure setting position.

Several embodiments of the invention are illustrated in the accompanying drawings, in which:

FIG. 1 is a fragmentary top plan view of a camera having an intra-lens shutter assemblage as provided by the invention. The shutter assemblage includes a film sensitivity setting member as well as a combined selector and manual diaphragm-setting member. The latter member is shown in the "automatic" position.

FIG. 2 is a developmental drawing showing the disposition of the setting marks, for both "automatic" and "non-automatic" diaphragm settings, as provided on the outer periphery of the combined selector and manual diaphragm setting member.

FIG. 3 is a diagrammatic representation of a photocell shading mechanism as provided by the invention for changing the illumination by shutting-off portions of the photoelectric cell of the light intensity measuring device which controls the automatic setting of the diaphragm. This view also shows the connection between said device and the film sensitivity setting member.

FIG. 4 is a diagrammatic representation of a photoelectric cell shading device showing a construction which is different from that of FIG. 3.

FIG. 5 is a diagrammatic representation of the movable system of the light intensity measuring device, the movable portion of said system being shown as associated with two fixed marks identifying or defining the operating range of the light intensity measuring device.

FIG. 6 is an elevational view of portions of the interior of the intra-lens shutter assemblage, showing a cam ring which is connected to the film sensitivity setting member and which provides for control of the shutter speed mechanism as well as control of the shading device provided for the photoelectric cell of the light intensity measuring device. There is also shown another cam ring which is connected to the selector member and which serves to control the shutter speed mechanism for the "non-automatic" settings of the selector.

FIG. 7 is a diagrammatic representation of the camera shown in FIG. 1, illustrating the construction of the diaphragm and the setting devices therefor. The automatic setting device for the diaphragm is made operative by placing the selector in the "automatic" position.

FIG. 8 is a view like that of FIG. 7, illustrating the automatic adjustment and positions of the parts when an automatic setting of the diaphragm is being effected.

FIG. 9 is a view like that of FIGS. 7 and 8 but showing the selector and the associated parts in the positions which they occupy for the "manual" position of the selector.

FIG. 10 is a fragmentary view of the parts shown in FIG. 9, but illustrating the action when the camera release is depressed.

FIG. 11 is a fragmentary view showing the parts illustrated in FIG. 6 with the addition of a short-circuiting switch, arranged in the circuit of the light intensity measuring device. The short-circuiting switch is operable and closed by a cam ring which is connected to the selector and is operative for this purpose in response to setting of the selector in its "non-automatic" position.

FIG. 12 is a view similar to that of FIG. 11, but showing the short-circuiting switch in its closed condition.

FIG. 13 is a schematic circuit diagram of the electric portion of the light intensity measuring device, in the circuit of which the short circuiting switch shown in FIGS. 11 and 12 is arranged.

FIG. 14 is a diagrammatic representation of the diaphragm adjusting mechanism and the device by which manual setting of the diaphragm is effected, the construction in this figure being different from the construction shown in FIGS. 7–10. The arrangement for effecting manual setting of the diaphragm is shown in its "operative" position.

FIG. 15 is a fragmentary view of the parts shown in FIG. 14, and illustrating the depressed position of the camera release. By means of the selector device, the diaphragm has been set at another aperture value, as compared with that shown in FIG. 14.

FIG. 16 illustrates another embodiment of the invention, differing from that of FIGS. 11 and 12, and showing a modified device for connecting the speed control device to the selector member, as well as for operating the short-circuiting switch which is provided in the circuit of the light intensity measuring device. The parts are shown in the positions which they occupy when the selector is placed in the "automatic" position.

FIG. 17 is a view like that of FIG. 16, but with the selector device being set at "non-automatic" position.

Referring to FIG. 1, the housing or case of the camera is indicated by the numeral 1. Fixed to the front side of the case 1 is an intra-lens shutter assemblage 2 in a well-known manner. The intra-lens shutter assemblage 2 has a shutter housing 3 in the rear portion of which there is mounted a lens diaphragm, which is described later. Positioned at the front of the housing 3 is a speed setting ring 5 (also described later) which is secured in place in a known manner, by means of a front plate 6. The plate 6 carries on its conical outer surface a setting or index mark 7 to which there may be referred a distance or range scale 9 provided on the distance setting ring 8 of the lens assemblage.

In accordance with the invention, provision is made for taking into consideration different film sensitivities, by a novel combination which includes a well-known device for obtaining various shutter speeds which are suited for taking photographs with the camera manually held and which includes an equally well-known device for changing the sensitivity of the light intensity measuring device, all in conjunction with a speed setting ring 5 which is constituted and arranged to control the said two devices and which has for this purpose control members so arranged that, upon shifting of the speed setting ring over its range of adjustment there is defined and had a setting range for film sensitivity, by virtue of effecting a change of shutter speed and/or sensitivity of the light intensity measuring device. The said setting range may be indicated by a suitable film sensitivity scale 10, which is associated with the speed setting ring 5.

In FIG. 1 the film sensitivity scale 10 is provided on the outer periphery of the shutter housing 3, and a setting mark 11 which is cooperable with the said scale is provided on the speed setting ring 5. The film sensitivity scale, in the illustrated embodiment of the invention, comprises the values from 12° to 24° DIN. In order to positively avoid spoiling of a picture due to movement of the camera during the taking of a snapshot, and to insure the obtaining of sharp photographs even when photographing comparatively rapidly moving objects, the exposure time range or shutter speed range from 1/500 to 1/90 of a second is utilized and correlated with a portion of the film sensitivity range. In addition, in order to cover fully the film sensitivity range, a change of the sensitivity of the light intensity measuring device is effected. The correlation of the speed values and values obtained by changing the sensitivity of the light intensity measuring device with the film sensitivity values shown on the scale 10 may be effected, for example, by values given in a table which follows. The table below is based on the assumption that a light intensity of an object, of fifty thousand apostilb can be considered as the maximum light intensity which occurs in practice.

| Film sensitivity ° DIN | 24 | 21 | 18 | 15 | 12 |
|---|---|---|---|---|---|
| Exposure time (1/ . . . sec.) | 500 | 250 | 125 | 125 | 90 |
| Shading (screening) in light values | | | | 1 LW | 1½ LW |
| Asb: | | | | | |
| 50,000 | f: 22 | f: 22 | f: 22 | f: 16 | f: 13.5 |
| 25,000 | 16 | 16 | 16 | 11 | 9.5 |
| 12,500 | 11 | 11 | 11 | 8 | 6.8 |
| 6,400 | 8 | 8 | 8 | 5.6 | 4.8 |
| 3,200 | 5.6 | 5.6 | 5.6 | 4 | 3.4 |
| 2,400 | 4.8 | 4.8 | 4.8 | 3.4 | 2.8 |
| 1,600 | 4 | 4 | 4 | 2.8 | |
| 800 | 2.8 | 2.8 | 2.8 | | |

As is apparent from the above compilation, the film sensitivity values from 24° to 18° DIN are taken into consideration exclusively by a change in the shutter speed. Shutter speeds of 1/500 of a second, 1/250 of a second and 1/125 of a second are correlated in the above named order with the values 24°, 21° and 18° DIN, while corresponding exposure times or shutter speeds are correlated with the intermediate values 19°, 20°, 22° and 23° DIN. The film sensitivity values from 15° to 12° DIN are taken into consideration by utilizing a shutter speed of 1/125 of a second and by effecting a change in the sensitivity of the light intensity measuring device by one light value, and correlating this with the first named value, namely 15°. For a film sensitivity value of 12° DIN there is utilized a shutter speed of 1/90 of a second and a further change in the sensitivity of the light intensity measuring device, this change being by an amount equal to one-half light value.

The invention thereby produces the result that a comparatively large or appreciably expanded film sensitivity range can be taken into consideration, while extensive use is made of the diaphragm adjustment range and only those shutter speeds are used exclusively which insure a sharp picture of moving objects and also prevent the likelihood of spoilage of a picture due to moving of the camera while it is held in the hand.

To effect a setting of the shutter speed, a cam ring 12 is connected to the setting ring 5 (FIGS. 6, 11 and 12), said cam ring being positioned about the tubular nozzle or connection 13a of a well-known base plate 13 which carries the members or portions of the shutter mechanism. A cam 12a of the ring 12 provides for setting, in a manner known per se, a control segment 14 which is driven by the main drive member of the shutter when the latter is running down, this being for the purpose of utilizing an exposure time escapement mechanism (which is not shown for the sake of clarity of illustration).

A two-armed lever 16 (FIG. 6) is pivotally mounted about an axis or pivot pin 15 in the housing 3 and serves to connect the control segment 14 with the cam ring 12. The control segment 14 engages one arm of the lever under the action of a spring 18 disposed about the pivot pin 17 of the segment and biasing the latter clockwise, whereas the other arm of the lever is maintained in engagement with the cam edge 12a of the ring 12 under the action of a spring 19 which biases the lever 16 clockwise and is stronger than the spring 18 to enable it to overcome the latter.

A change in the sensitivity of the light intensity measuring device in response to adjustment for different film sensitivities from 12° to 15° DIN is obtained preferably by changing or masking a photoelectric cell 20 of the light intensity measuring device. The shading or masking means comprises two cover members 23 and 24 which are arranged on opposite sides of the photoelectric cell and are pivotally movable about axes 21 and 22. The cover members 23 and 24 are hingedly connected to arms 25 and 26. For the purpose of conjointly shifting the cover members 23 and 24, the arms 25 and 26 are pivotally connected to each other by means of a pin 27 which is shiftable in a guiding slot 1a provided in the camera housing 1.

A change in the sensitivity of the light intensity measuring device could also be brought about in another way, by a variable resistor which is actuated in response to setting of the speed setting member and is arranged in the circuit of the light intensity measuring device, to change the current delivered thereto. Or, in another known manner the measuring mechanism or instrument movement of the light intensity measuring device may be made rotatably adjustable, and may be shifted in response to adjustment of the speed setting member.

A cam which is connected to the speed setting ring 5 may be arranged to actuate the above-described shading or masking device in response to shifting of the ring. In the embodiment of the invention shown in FIGS. 4 and 6, the said cam is provided on the cam ring 12 and has the reference numeral 12b (FIG. 6). In the embodiment illustrated in FIG. 3 on the other hand, the cam is indicated at 28a, and is provided on a special ring 28, which is connected to the speed setting ring 5 by means of a pin 29 arranged in the interior of the shutter housing 3. As is apparent from the showing of the film sensitivity scale in FIG. 3 as associated with the cam 28a, the shading device comprising the members 21–27 remains unchanged for the range of film sensitivity values starting with 18° and ending with 24° DIN, whereas a change of the sensitivity of the light intensity measuring device by a total of one and one-half light values is brought about by means of the shading device when an adjustment of the setting member 5 is made in the range of film sensitivities starting with 15° and ending with 12° DIN.

The shifting movement of the cam which is connected to the setting ring 5 is transmitted to the shading device comprising the parts 21–27, in the embodiment shown in FIG. 3, by means of a cam follower pin 30 which has a line of movement parallel to the optical axis of the camera and which is shiftable in a bearing 31 provided on the camera. One end of the pin 30 engages the cam 28a under the action of a spring 32 connected with the cover members 23 and 24, whereas the other end of the pin engages a pivotal lever 34 which is positioned about an axis 33 provided on the camera case 1, thereby establishing the connection between the speed setting ring 5 and the cover members 23, 24.

In the embodiment of the invention shown in FIGS. 4 and 6, a connection is established between the cam 12b and the covering or masking device for the photoelectric cell 20 by means of a rotatable shaft 35. The shaft 35 carries at one end an arm 36 which has a cam follower pin 38 fixed thereto (FIG. 6). The pin 38 engages the cam 12b under the action of the afore-mentioned spring 32, as well as under the action of an additional spring 37 which imparts a counterclockwise bias to the arm 36, as seen in FIG. 6. Fixed to the other end of the shaft 35 is a bevel gear 39 which meshes with a second bevel gear 41 carrying an arm 40. The arm 40 engages the guide pin 27 which interconnects the two operating arms 25, 26 for the cover members 23, 24.

A sensing member is provided for connection to an actuating mechanism of the diaphragm, to serve in a well-known manner for effecting automatic setting of the diaphragm in response to operation of the light intensity measuring device. The sensing member senses the position of the movable portion or member of the light intensity measuring device, and is made operative in response to operation of the camera or shutter release.

The sensing member 43 shown in FIGS. 7–10 and in FIGS. 14 and 15 is movable in a vertical direction as seen in these figures, and is acted on by a compression spring 44 which tends to keep it in engagement with a collar or flange 45a provided on the camera or shutter release plunger 45. The spring 44 is overcome by a stronger spring 46 which acts on the release plunger 45, so that the sensing member 43 normally occupies the positions shown in FIGS. 7, 9 and 14 when the release plunger is not depressed. For the purpose of cooperating with the movable coil 47 (see FIG. 5) of the galvanometer 42 of the light intensity measuring device, the sensing member 43 has a stepped edge 43a by which it engages, upon actuation of the release plunger 45 and under the action of the compression spring 44, a needle or pointer 49 carried by the moving coil 47 of the galvanometer. The needle 49 is movable over a fixed backing member or anvil 48. Prior to effecting the sensing operation, the needle 49 is secured in its adjusted position in a well-known manner by means of a suitable clamping device. The clamping device as shown herein comprises a lever 51 which is pivotally carried by a pin 50, the lever 51 being under the control of the sensing member 43 and being cooperable with the needle 49 under the action of a spring 52 so as to clamp the said needle and hold the same motionless against the backing surface 48. The spring 52 imparts a clockwise bias to the clamping lever 51, as seen in FIGS. 7–9 and 14, as will be understood.

The sensing member 43 is arranged to operate a diaphragm actuating ring 53 which a light spring 54 tends to hold in the starting position shown in FIGS. 7, 9 and 14. A cooperable or driving connection is established between the sensing member 43 and the diaphragm actuating ring 53 by means of an arm 53a provided on the ring, which is disposed in the path of movement of a pin 55 provided on the sensing member 43. The diaphragm itself, in the illustrated embodiment of the invention, is constituted as a sector or lamella diaphragm, the segments or lamellas 56 of which are pivotally mounted about fixed bearing pins 57 and have pin-and-slot connections 56a, 58 with the actuating ring 53.

In view of the universal applicability of a camera as provided by the invention, it is of advantage if the setting of the diaphragm may be carried out not only by means of the above described automatic setting mechanism, but also in a manual manner.

According to a further construction provided by the invention, this is effected by the provision of a manually operable selector or "switching" device or member which can be set at "automatic" and "non-automatic" positions and which selector enables either automatic adjustment of the diaphragm or manual adjustment of the diaphragm to be had without changing the position of the speed setting ring, the manual adjustment being obtained as by moving the selector to a setting providing an exposure time or speed suited for flash exposures.

The selector device comprises a rotatable ring 59 which is arranged to be concentric with the optical axis of the lens assemblage, said ring serving not only as a selector device but also simultaneously as a manually operable setting member for the diaphragm. For setting purposes, the ring 59 as shown in the embodiment of the invention illustrated in FIGS. 1 and 2, carries a setting or index mark 60 comprising the word "auto," and also has a diaphragm scale 61 having symbols indicating an electronic flash and also a combustion flash lamp. These symbols are clearly seen in FIG. 2. The designation 60 and the scale 61 are referable to an index mark 62 which is provided on the front plate 1b of the camera case. In the embodiment of the invention shown in FIGS. 7–9, on the other hand, the selector 59 constitutes a carrier for an index mark 63 which corresponds to the mark 62, whereas a setting mark or designation 64 comprising the word "auto" and a diaphragm scale 65 are fixedly mounted or arranged.

The operation of rendering inoperative the automatic setting mechanism for the diaphragm in response to shifting of the selector to the "non-automatic" position (as by bringing into use either the diaphragm scale 61 or the diaphragm scale 65 with the associated index marks 62 and 63), is effected in a simple manner by retaining the sensing member 43 in its initial or starting position. For this purpose, the sensing member 43 is provided with a projection 43b, by means of which it engages the outer periphery of the selector ring 59 upon the latter being shifted to the "non-automatic" position, this engagement being illustrated in FIGS. 9, 10 and 14, 15. This causes the sensing member 43 to be retained, during the operation of the camera release 45, in a starting position wherein its control influence on the diaphragm is eliminated.

In order to effect adjustment of the diaphragm, in the case of a manual setting being desired, the embodiment of the invention shown in FIGS. 7–10 has cooperable driving means provided on the diaphragm actuating ring 53 and the selector ring 59. This cooperable driving means does not involve any additional expenditure, since a cylindrically shaped extension 59a of the ring 59 is utilized and arranged so that a portion of its circumference overlaps the side wall of the shutter housing, the arm 53a of the diaphragm actuating ring 53 being disposed in the path of movement of one edge 59b of the extension 59a. The length of the opening or recess in the cylindrical jacket 59a corresponds at least to the distance between the marks 60 or 64 and the scales 61 or 65 respectively, plus the size of the range of adjustment of the diaphragm actuating ring 53. The adjusting moment of the selector ring 59 is so selected that the spring 54 is unable to effect an adjustment of the diaphragm setting since it is unable to overcome the forces tending to hold the ring 59 in any adjusted position by which the desired diaphragm aperture is selected.

In the embodiment of FIGS. 14 and 15, the diaphragm is adjusted during the manual setting operation by a cam 59c which is provided on the selector ring 59, said cam being drivingly connected with the diaphragm actuating ring 53. The driving connection is established by a two-armed lever 67 which is mounted within the shutter housing 3 and pivots about an axis 66, one arm of the lever having a pin 68 affixed thereto and engaged with the cam 59c under the action of a spring 69. The other arm of the lever 67 engages a pin 70 provided on the diaphragm actuating ring 53.

By the use of a cam arranged on the selector ring 59 to operate the diaphragm during the manual setting of the same it is possible in an extremely simple manner to arrange the adjusting movement of the ring 59 so that it is substantially greater than the range of movement of the diaphragm actuating ring 53. This provides the advantage that the diaphragm scale may be expanded appreciably, thereby insuring a clearly visible and accurate setting of the diaphragm.

For the purpose of actuating the speed control device to obtain a shutter speed which is suited for flash exposures during the manual setting of the diaphragm, the ring 59 has a cam which is arranged to adjust the control segment 14 of the speed control device in response to setting of the selector ring in the "non-automatic" position.

In the embodiment of the invention shown in FIGS. 6, 11 and 12, the cam which cooperates with the control segment 14 is given the reference numeral 71a. The carrier for said cam is a special ring 71 which is positioned about the tubular nozzle 13a of the shutter base plate 13 and is connected to the diaphragm actuating ring 53. To establish a driving connection, an opening or recess 71c is provided on one arm 71b of the ring 71 said recess being engaged by an arm 53b of the diaphragm actuating ring 53 (FIG. 6).

The adjusting movement of the cam 71 is transmitted to the control segment 14 in a simple manner, with the aid of the afore-mentioned lever 16 which, at "automatic" setting of the selector 59, establishes the connection between the cam 12a of the speed setting ring assemblage 5, 12 and the control segment 14.

In the embodiment illustrated in FIGS. 16 and 17 there is provided a cam on a portion or member 59d of the selector setting ring 59, said cam overlapping the rear of the shutter housing 3. This cam has the reference numeral 59e, and is operative to actuate the control segment 14 at the "non-automatic" position of the selector ring 59. For the purpose of connecting the cam 59e with the control segment 14, two lever arms 72 and 74 are provided, said arms being affixed to the two ends of a spindle 73 which projects through the rear wall of the shutter housing. One lever arm 74 is provided on the outside of the rear wall of the shutter housing, and has a pin 75 affixed thereto, which engages under the action of a spring 76 the circumferential surface of the member 59d, the said circumferential surface enclosing the cam 59e. The lever arm 72 is located in the interior of the shutter housing 3 and cooperates with the above-mentioned lever 16. This cooperation is such that, upon the selector ring 59 being placed in the "automatic" position, the arm 72 is disposed out of engagement with the lever 16, so that the latter engages the cam 12a of the ring 12 for the purpose of setting shutter speeds which are suited for the taking of photographs where the camera is manually held (see FIG. 16). Upon the selector being set at the "non-automatic" position, on the other hand, the arm 74 occupies, due to the effect of the cam 59e, a position in which it engages a pin 77 of the lever 16 so as to pivot the latter into the position shown in FIG. 17, for the purpose of setting the control segment 14 at an exposure time which is suited for flash exposures.

In order to switch off or render inoperative the light intensity measuring device when arranging the diaphragm for manual adjustment, an electric switch 78, 79 (FIG. 13) is located in the circuit of the device. When the switch 78, 79 is closed, the galvanometer 42 of the light intensity measuring device is short-circuited and rendered inoperative. This switch is operated by means of the cam 71a or 59e connected to the selector setting ring 59. In the embodiment of the invention shown in FIGS. 11 and 12, the closing of the switch 78, 79 is effected directly by the cam 71a, whereas in the embodiment shown in FIGS. 16 and 17 the switch closing is effected by means of the lever 16. In addition, a resistor 83 is arranged in the circuit of the light intensity measuring device, for the purpose of adjusting the same.

The method of operating the above described camera is as follows:

(a) Setting for film sensitivity:

This is done by an adjustment of the speed setting ring 5 after the coupling device 80 (FIG. 1) has first been released, the ring 5 being shifted until the setting mark 11 is opposite the sensitivity value on the scale 10 of the film which is being used. By this operation, the shutter speed which is correlated with the desired film sensitivity is set in the shutter, by means of the members 12, 12a, 14 and 16. In addition, upon setting for film sensitivities from the values 12° to 15° DIN inclusive, there is effected a shading or masking of the photo-electric cell 20 by means of the device comprising the parts 21–27 which is connected to the setting ring 5. Accordingly, there is a change in the sensitivity of the light intensity measuring device, as it responds to the existing light conditions.

(b) Activities of the operator prior to the taking of a photograph.

These activities are limited to choosing the desired exposure setting (either automatic or non-automatic) by adjustment of the selector ring 59, and in addition, checking whether or not the needle 49 of the galvanometer 42 is disposed within the range bounded by the marks 81, 82 (FIG. 5). If the needle 49 is not within the said range, this indicates that the light intensity is either too high or too low for effecting a proper exposure with the automatic exposure setting, considering the chosen film sensitivity.

(c) Carrying out an exposure with the automatic exposure setting:

This is done by depressing the camera or shutter release plunger 45. The sensing member 43 follows this movement, under the action of its spring 44, and the measuring mechanism needle 49 is initially clamped by the lever 51 at the initiation of such movement. Thereafter, the sensing member 43 engages the diaphragm actuating ring 53 and shifts the same against the action of the spring 54 to an extent determined by engagement of one of the steps 43a of the sensing member with the needle 49. Such engagement terminates the movement of the sensing member, and the adjustment of the diaphragm.

In order to insure, during this operation, proper adjustment of the diaphragm aperture by means of the sensing member 43 in conjunction with the measuring mechanism needle 49 of the light intensity measuring device, that is, insure that the diaphragm aperture remains unchanged independently of the adjusted shutter speed, at least until the camera shutter is again closed, a locking device may be provided, by which the camera or shutter release 45 after having been initially actuated, is retained in the depressed position until the camera shutter fully closes after having been opened for the exposure.

(d) Carrying out an exposure utilizing a manually set diaphragm aperture:

For this purpose the selector ring 59 is set at the desired diaphragm value on the scale 61 or 65, utilizing the appropriate setting mark 62 or 63. When the ring 59 is set in this manner, a portion of its outer circumference moves into the path of movement of the projection 43b of the sensing member 43, so that the latter in response to operation of the camera or shutter release is retained in its inoperative position. Moreover, upon the ring 59 being set utilizing the diaphragm scale as above outlined, the driving mechanism 59b, 53a (FIGS. 7–10) or the control device 59c, 67, 70 (FIGS. 14 and 15) which extends between the ring 59 and the diaphragm actuating ring 53 becomes operative, whereby the diaphragm is set at the value indicated on the scale 61 or the scale 65.

I claim:

1. In a photographic camera of the type wherein the diaphragm is automatically adjusted by a light-intensity measuring device, and wherein there is a shutter-speed setting member, in combination, a speed-adjusting mechanism providing a plurality of exposure times suitable for taking pictures with the camera hand-held; response-control means for changing the degree of response of the light-intensity measuring device to light from the subject to be photographed; a film sensitivity scale means for referencing said setting member, said scale means including a first portion and a second portion means including control members operatively connected with the speed setting member, for effecting a control over said speed-adjusting mechanism and said response-control means in a manner wherein the referencing of said setting member over the first portion of said scale means effects an adjustment of the speed-adjusting mechanism only and the referencing of said setting member over the second portion of said scale means effects a coordinated adjustment of both the speed-adjusting mechanism and the amount of light striking the light-intensity measuring device.

2. A camera as in claim 1, in which the response-control means comprises a device for changing the amount of light which strikes a photo-sensitive cell.

3. A camera as in claim 2, in which one of the control members comprises a cam, and in which there is a cam follower engaged with said cam and connected with the said response-control means.

4. A camera as in claim 1, in which there is a selector means independent of the speed setting member and settable at "automatic" and "non-automatic" positions, said means including a device rendering inoperative the control of the diaphragm effected by the light intensity measuring device when the means is in "non-automatic" position, including a mechanism for effecting manual control of the diaphragm, and further including a device for actuating the speed-adjusting mechanism to effect a shutter speed suited for the making of flash exposures.

5. A camera as in claim 4, in which there is a diaphragm actuating mechanism and a sensing member engageable with the actuating mechanism and controlled by a movable member of the light-intensity measuring device in response to actuation of the camera release, and in which there is a locking device operable by the selector means, for holding the sensing member in an inoperative position corresponding to one extreme adjustment of the diaphragm when the selector means is in "non-automatic" position.

6. A camera as in claim 5, in which the locking device comprises a blocking surface on the selector means, arranged to be disposed in the path of movement of a portion of the sensing member.

7. A camera as in claim 5, in which the mechanism for effecting manual control of the diaphragm comprises cooperable drive members on the diaphragm actuating mechanism and selector means, said members being engaged when the selector means is in "non-automatic" position.

8. A camera as in claim 4, in which there are diaphragm-aperture scale means connected with the selector means and with a stationary part of the camera.

9. A camera as in claim 4, in which the mechanism for effecting manual control of the diaphragm comprises a cam provided on the selector means.

10. A camera as in claim 4, in which the device for actuating the speed adjusting mechanism comprises a cam connected to the selector means, and comprises a cam follower connected to the said speed-adjusting mechanism.

11. A camera as in claim 4, in which the device for rendering inoperative the control of the diaphragm by the light-intensity measuring device comprises an electrical switch in the measuring device circuit, for short-circuiting the measuring device in response to the selector means being placed in "non-automatic" position.

12. In a photographic camera of the type having a diaphragm means which is adapted to be automatically adjustable by a light intensity measuring device and having a variable speed shutter means; the improvement of means for defining a setting range for film sensitivity, said latter means including a setting means, a range of endices for referencing said setting means, said range of endices including a first portion and a second portion, and control means operatively connected between said setting means and said light intensity measuring device and between said setting means and said variable speed shutter means whereby the setting means effects a control influence over said shutter speed means and over the amount of light which strikes said light intensity measuring device in a manner wherein the referencing of said setting means over the first portion of said range effects an adjustment of the shutter speed means only and the referencing of said setting means over the second portion of said range effects a coordinated adjustment of both the shutter speed means and the amount of light striking the light intensity measuring device.

13. The invention as defined in claim 12 wherein said control means includes a cam ring connected with said setting means so as to be rendered operative in response to the setting of said setting means, means connected between said cam ring and said shutter speed means and between said cam ring and said light intensity measuring device actuated by the setting of said cam ring to effect control over the speed of said shutter means only when the setting means is referenced over said first portion of said range and to effect coordinated adjustment of both the shutter speed means and the light intensity measuring device when the setting means is referenced over the second portion of said range.

14. The invention as defined in claim 12 wherein said setting range is referenced to film sensitivity and said control means includes a cam ring connected to said setting means so as to be rendered operative in response to the setting of said setting means, cam follower means operatively associated with said cam ring and said shutter speed means for establishing a shutter speed in accordance with the setting of said setting means, means operatively connected between said cam ring and said light intensity measuring device to effect a change in the amount of light which strikes said device, said cam ring being constructed to effect actuation of said cam follower means only when said setting means is referenced to said first portion of the film sensitivity range, and to effect simultaneous actuation of both said cam follower means and said means for changing the amount of light striking said device when said setting means in reference to said second portion of the film sensitivity range.

References Cited in the file of this patent
UNITED STATES PATENTS

| | | |
|---|---|---|
| 1,584,408 | Topliff et al. | May 11, 1926 |
| 2,061,909 | Karg | Nov. 24, 1936 |
| 2,418,370 | Simmon | Apr. 1, 1947 |
| 2,421,499 | Guedon | June 3, 1947 |
| 2,841,064 | Bagby | July 1, 1958 |
| 2,918,854 | Malek | Dec. 29, 1959 |